(No Model.)

A. W. BROWN & J. MEIKLEJOHN.
SAWING MACHINE.

No. 596,802. Patented Jan. 4, 1898.

WITNESSES:

INVENTORS:
A. W. Brown.
J. Meiklejohn.
BY
ATTORNEYS.

UNITED STATES PATENT OFFICE.

ANDERSON W. BROWN AND JAMES MEIKLEJOHN, OF RHINELANDER, WISCONSIN.

SAWING-MACHINE.

SPECIFICATION forming part of Letters Patent No. 596,802, dated January 4, 1898.

Application filed October 14, 1896. Serial No. 608,798. (No model.)

*To all whom it may concern:*

Be it known that we, ANDERSON W. BROWN and JAMES MEIKLEJOHN, of Rhinelander, in the county of Oneida and State of Wisconsin, have invented a new and Improved Sawing-Machine, of which the following is a full, clear, and exact description.

The object of the invention is to provide a new and improved sawing-machine which is simple and durable in construction, very effective in operation, and more especially designed for conveniently and rapidly sawing down trees and sawing the logs into desired lengths.

The invention consists of certain parts and details and combinations of the same, as will be fully described hereinafter and then pointed out in the claims.

Reference is to be had to the accompanying drawing, forming a part of this specification, in which similar characters of reference indicate corresponding parts.

The figure is a sectional side elevation of the improvement.

The improved sawing-machine is provided with a frame A, mounted to swing on the bearings B for a shaft C, carrying a pulley C', connected by belt with other machinery for imparting a rotary motion to the said shaft C. The latter may also be rotated by hand, if desired.

On the shaft C is secured a sprocket-wheel D, over which passes an endless crosscut-saw E, formed of sprocket-links E' and intermediate links $E^2$, pivotally connected with each other, each sprocket-link E' being provided with inwardly-extending sprocket-teeth $E^3$ and with outwardly-extending saw-teeth $E^4$. The intermediate links $E^2$ are only formed with outwardly-extending saw-teeth $E^5$. Each sprocket-link E' is also formed of a pair of links, with the intermediate links $E^2$ connected between the pair of links, as indicated in the drawing. By this arrangement three rows of teeth are formed for cutting a wide kerf in a tree or log. The teeth $E^3$ of the sprocket-links E' engage between the teeth of the sprocket-wheel D, the latter being preferably flanged on both sides to form guides for the sides of the links. The endless saw $E^5$ also passes over a sprocket-wheel F, journaled in the outer end of a plate A' on a longitudinally-extending plate $A^2$, adjustably held on the side arms $A^3$, mounted to swing on the bearings B and forming with the plates $A^2$ A' the frame A.

In the inner ends of the arms $A^3$ are arranged transversely-extending bolts G, engaging longitudinal slots $A^4$, formed in the plate $A^2$, so that when the bolts are loosened the plates $A^2$ and A' can be moved outward or inward, according to the length of the endless saw E. Proper tension is given to the saw by a screw-rod H, having a head H' held stationary in a cross-piece $A^5$, connecting the side arms $A^3$ with each other. A nut $H^2$ screws on the screw-rod H and abuts against the inner end of the plate $A^2$, so that by screwing up the nut $H^2$ at the time the bolts G are loosened it is possible to move the plates $A^2$ and A' outward and give the desired tension to the endless saw E.

Now it will be seen that when it is desired to cut down a tree then the machine is set with the shaft C in a vertical position and with the saw extending horizontally and the forward end in engagement with the tree. A rotary motion given to the shaft C causes a traveling of the endless saw E in the direction of the arrow a', so that the forward run of the saw cuts into the tree, a feeding being accomplished by swinging the frame A inward.

When it is desired to cut a felled tree into suitable lengths, then the machine is held with the shaft C in a horizontal position and the frame A is swung downward to bring the lower run of the endless saw in engagement with the top of the log or felled tree. The weight of the frame and the parts of the saw supported thereon is sufficient to feed the saw downward automatically, with the frame A swinging from the bearings B as the fulcrum.

Having thus described our invention, we claim as new and desire to secure by Letters Patent—

1. The combination of a revolubly-mounted shaft, a pulley fixed to the shaft, two arms carried by the shaft respectively on the sides of the pulley, a plate having a slot therein, a bolt carried by the outer ends of the arms and running through the slot in the plate, a cross-piece running between the arms, a screw engaging the cross-piece and the plate to adjust the plate relatively to the arms, a pulley carried by the plate, and an endless flexible saw run over the two pulleys.

2. The combination of a revolubly-mounted shaft, of two arms carried by the shaft and run outward from the shaft and toward each other, a slotted plate located between the outer ends of the arms, a bolt carried by the arms and running through the slot in the plate, a rigid cross-piece running between the arms, a screw engaging the cross-piece and the plate to adjust the plate relative to the arm, and a flexible endless saw supported by the arms and plate and driven from the shaft.

3. The combination of a revolubly-mounted shaft, two arms carried on the shaft and run outward therefrom, a plate located between the outer ends of the arms, the plate having sliding connection with the arms, a screw engaging the plate and having connection with the arms whereby to hold the plate adjustably with reference to the arms, and an endless flexible saw supported by the arms and plate and driven from the shaft.

ANDERSON W. BROWN.
JAMES MEIKLEJOHN.

Witnesses:
W. E. BROWN,
M. H. RAYMOND.